Patented Sept. 26, 1950

2,523,742

UNITED STATES PATENT OFFICE 2,523,742

BETA-ACETAMIDO-BETA,BETA-DICARB-ALKOXY PROPIONALDEHYDES AND PROCESS

Donald T. Warner and Owen A. Moe, Minneapolis, Minn., assignors to General Mills, Inc., a corporation of Delaware No Drawing. Application December 6, 1946, Serial No. 714,643

4 Claims. (Cl. 260—482)

The present invention relates to the preparation of various intermediate aldehydo compounds which are extremely useful for further syntheses. These aldehydo compounds are new and novel intermediates and are particularly useful in the synthesis of amino acids.

The aldehydo compounds contemplated by the present invention may be illustrated by the following general formula:

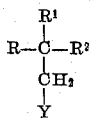

where R is hydrogen, carboxyl, carboxylic acid ester, carbonamide (—CONH$_2$, —CONHR etc.), or nitrile; R$^1$ is carboxyl, carboxylic acid ester, carbonamide or nitrile; R$^2$ is a substituted amino group in which one or both of the hydrogens have been replaced; and Y is an aldehyde or acetal group. The esterifying group of the carboxylic acid ester may vary widely and may include alkyl, aryl, aralkyl, alkaryl and other groups; typical of these are methyl, ethyl, propyl, phenyl, benzyl, toluyl, etc. Of these the low alkyl groups are preferred. Similar variations are possible in the substituted carbonamide groups. R$^2$ may be practically any substituted amino group such as phthalimido; N alkyl, for example N-methyl, etc.; N aryl, for example N-phenyl, etc.; N-acyl, for example NOCCH$_3$, NOCC$_6$H$_5$, etc.; N sulfonyl, for example NSO$_2$C$_6$H$_5$; N carbobenzoxy, for example NCOOCH$_2$C$_6$H$_5$; and the like. It will be apparent that R$^2$ may be mono-substituted or may be di-substituted by any group or combination of groups of the above type. These compounds may be made in a number of ways as will be pointed out more fully hereinafter.

It is therefore an object of the present invention to provide novel aldehydo compounds which are useful as intermediates particularly for the synthesis of amino acids.

It is a further object to provide novel processes of producing these compounds.

It is a still further object of the present invention to provide novel syntheses of amino acids employing the novel aldehydo compounds disclosed herein.

These and other objects of the invention will be more fully apparent from the following description with particular reference to specific examples which are to be understood as illustrative only and not as limiting the invention.

These aldehydo compounds may be prepared in accordance with the following equation:

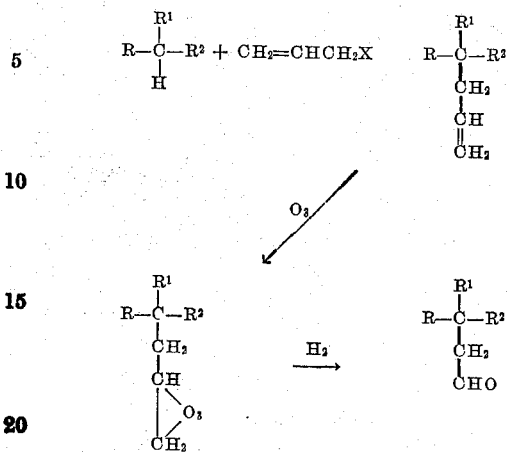

in which X is halogen and R, R$^1$, R$^2$ are as previously defined with the exception that R should not be H during the addition of the allyl halide. After the condensation of the halide, the group R, which originally may have been carbalkoxy, may be converted to H by decarboxylation. It is also possible to convert R to H after the aldehyde has been formed by converting the aldehyde to the acetal, decarboxylating, and then hydrolyzing the acetal.

The compounds in the above formula in which R and R$^1$ may be carbonamide or nitrile, may be prepared from the compounds in which these groups are carboxyl or carboxylic acid ester by first protecting the aldehyde group, as for example, by converting it to the acetal, then forming the amide or nitrile in a conventional manner, after which the acetal may be reconverted to the aldehyde.

For example, the above reaction between ethyl acetamido-malonate and allyl bromide may be carried out in the presence of an alkaline catalyst. This reaction proceeds nicely to yield the desired allyl derivative. The resulting ethyl-2-acetamido-2-carbethoxy-4-pentenoate is an oil which crystallizes slowly and melts at 44–45° C. Hydrogenation yields the saturated n-propyl derivative, melting at 92–93° C. The allyl derivative may be ozonized in the presence of ethyl alcohol at 0–5° C. Hydrogenation of the alcoholic solution of the ozonide may be carried out in the presence of a palladium catalyst deposited on charcoal. After the reduction of the ozonide, the reaction mixture may be filtered and the ethyl alcohol and formaldehyde (formed during the reaction) is removed by evaporation in vacuo. The residual oil crystallizes slowly on standing. The crystalline aldehyde may be purified by recrystallization from ethanol and melts at 74° C. The aldehyde may be converted to the 2,4-dinitrophenylhydrazone, which after purification by crystallization from alcohol, yields yellow crystals melting sharply at 117–119° C.

The following example will serve to illustrate the invention:

EXAMPLE

A. *The preparation of ethyl 2-acetamido-2-carbethoxy-4-pentenoate*

To a solution of 3.45 parts of sodium in 300 parts of absolute alcohol, there was added 32.7 parts of ethyl acetamido malonate. The resulting solution was heated to the reflux temperature and a slight turbidity was noted. After the reflux temperature was attained, 19.5 parts of allyl bromide were added over a fifteen-minute period. After the addition of the allyl bromide was complete, the reaction mixture was refluxed for a period of 9.5 hours. The reaction mixture was cooled and the precipitated sodium bromide was removed by filtration. The light yellow filtrate was concentrated in vacuo. The residual oil contained a small amount of sodium bromide which was removed by filtration.

B. *Ozonolysis of ethyl 2-acetamido-2-carbethoxy-4-pentenoate*

Nine parts of the unsaturated ester were dissolved in 40 parts of absolute ethanol. Ozone was passed through the solution at a temperature of 0 to 5° C. until the reaction was complete. The alcoholic solution at this point was water-white in color.

C. *Decomposition of the ozonide*

The alcoholic solution of the ozonide was mixed with 0.5 part of palladium on charcoal and subjected to hydrogenation in a Parr hydrogenator at room temperature and at approximately 25 pounds pressure. The reaction was stopped when the hydrogenation appeared to be complete. The catalyst was removed by filtration and the alcohol and the volatile aldehyde were removed by evaporation in vacuo. The residual oil slowly crystallized on standing at room temperature. The crude crystalline product melted at 65 to 68° C. This product was purified by crystallization from alcohol and melted sharply at 74.5 to 76° C. This crystalline aldehydo compound yielded the 2,4-dinitrophenylhydrazone in accordance with known procedures. The crude 2,4-dinitrophenylhydrazone melted at 116–119° C. and after purification by crystallization from ethanol, it melted at 117–119° C.

In place of the allyl bromide employed in this example, it is also possible to substitute other allyl halides such as allyl chloride or allyl iodide. The ozonolysis was conducted at 0–5° C. in the presence of ethyl alcohol as a solvent. It is possible, however, to employ other solvents such as acetone, ethyl acetate, and the like. It is likewise possible to vary the temperature employed within the approximate range of −10° C. to 20° C. The reduction of the ozonide may be accomplished by means of other catalysts such as Raney nickel; likewise the solvent employed during this reduction may be other than the ethyl alcohol described in the example. For example, acetone is another suitable solvent.

Numerous other reactants are possible for condensation with the allyl halide. These reactants may be selected such that they will contribute the desired groups to the ultimate product. A particularly desirable reactant in this respect is ethyl acetamido cyanoacetate.

The aldehydo compounds of the present invention are particularly useful in the synthesis of a number of amino acids. The following reactions demonstrate the preparation of lysine from beta,beta-dicarbethoxy-beta-acetamido propionaldehyde:

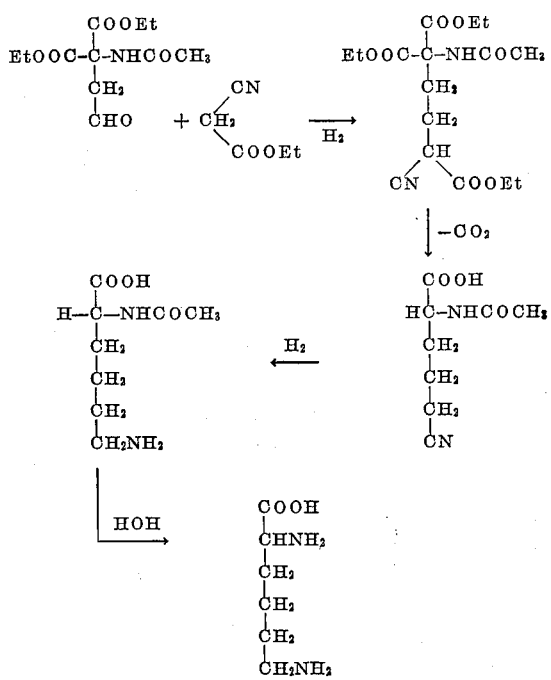

Glutamic acid and ornithine may be prepared in accordance with the following series of reactions:

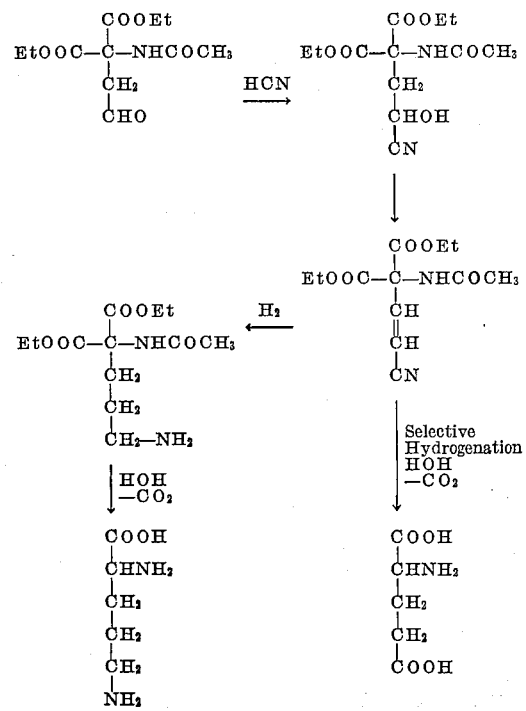

Aspartic acid may be synthesized in accordance with the following reactions:

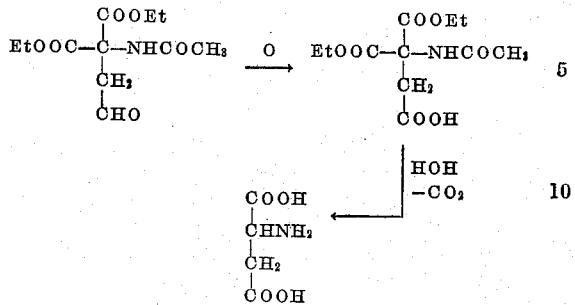

In addition to these amino acid syntheses, these aldehydo compounds are capable of use in the synthesis of other organic compounds; for example, it is possible to form the phenylhydrazone of the aldehyde and to cyclicize the phenylhydrazone to yield ethyl-alpha-acetamido-alpha-carbethoxy-alpha-(3-indole) acetate which in turn may be converted to alpha-amino-alpha-(3-indole) acetic acid.

While various modifications of the above invention have been described, it is to be understood that the same is not limited thereto, but may be varied within the scope of the following claims.

We claim as our invention:

1. A compound having the following structural formula:

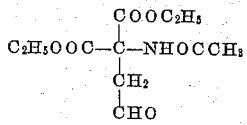

2. A compound having the following structural formula:

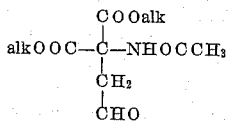

in which alk represents a lower alkyl group.

3. Process of making aldehydo compounds having the following structural formula:

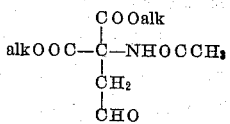

in which alk represents a lower alkyl group, which comprises refluxing an acetamido malonate with an allyl halide to produce the unsaturated compound having the formula

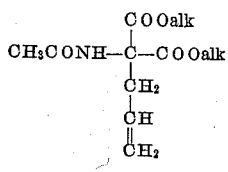

reacting said unsaturated compound with ozone at a temperature of 0–5° C. to convert said unsaturated compound to an ozonide, and then reacting the ozonide with hydrogen in the presence of a palladium catalyst to produce the aldehyde.

4. Process of producing beta,beta-dicarbethoxy-beta-acetamido propionaldehyde which comprises refluxing ethyl-acetamido malonate with an allyl halide to produce ethyl-2-acetamido-2-carbethoxy-4-pentenoate, reacting said last mentioned compound with ozone at a temperature within the range of 0–5° C. to convert said compound to an ozonide, and subjecting said ozonide to hydrogenation in the presence of palladium to produce said aldehyde.

DONALD T. WARNER.
OWEN A. MOE.

REFERENCES CITED

The following references are of record in the file of this patent:

UNITED STATES PATENTS

| Number | Name | Date |
|---|---|---|
| 2,093,519 | Hamann | Sept. 21, 1937 |

OTHER REFERENCES

Farmer et al.: "Jour. Chem. Soc." (London), 1936, pp. 1804–1809.

Albertson et al.: "Jour. Am. Chem. Soc.," vol. 68 (1946), pp. 450–453.

Fischer et al.: Ber Deut. Chem., vol. 65B (1932), pp. 1467–1472.